(12) United States Patent
Takatsu et al.

(10) Patent No.: US 12,053,837 B2
(45) Date of Patent: Aug. 6, 2024

(54) LASER MACHINING APPARATUS AND LASER MACHINING HEAD

(71) Applicant: AMADA CO., LTD., Kanagawa (JP)

(72) Inventors: Masato Takatsu, Kanagawa (JP); Jun Setoguchi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 577 days.

(21) Appl. No.: 17/423,495

(22) PCT Filed: Jan. 10, 2020

(86) PCT No.: PCT/JP2020/000692
§ 371 (c)(1),
(2) Date: Jul. 16, 2021

(87) PCT Pub. No.: WO2020/153157
PCT Pub. Date: Jul. 30, 2020

(65) Prior Publication Data
US 2022/0072654 A1    Mar. 10, 2022

(30) Foreign Application Priority Data

Jan. 23, 2019   (JP) .................................. 2019-009101

(51) Int. Cl.
*B23K 26/06* (2014.01)
*G02B 3/08* (2006.01)
(Continued)

(52) U.S. Cl.
CPC ............ *B23K 26/0648* (2013.01); *G02B 3/08* (2013.01); *G02B 5/001* (2013.01); *G02B 27/0927* (2013.01)

(58) Field of Classification Search
None
See application file for complete search history.

(56) References Cited

U.S. PATENT DOCUMENTS 5,289,553 A * 2/1994 Ortiz, Jr. ............. G02B 6/4296
385/74
9,520,693 B2   12/2016 Matsumoto
(Continued)

FOREIGN PATENT DOCUMENTS

CN    103231173 A    8/2013
CN    103534056 A    1/2014
(Continued)

OTHER PUBLICATIONS

Machine translation of JP-2017001097 (Year: 2024).*
(Continued)

*Primary Examiner* — Geoffrey S Evans
(74) *Attorney, Agent, or Firm* — Renner, Otto, Boisselle & Sklar, LLP

(57) ABSTRACT

A laser machining apparatus includes a laser oscillator, a laser machining head including a housing, first and second optical elements configured to change a beam profile of a laser beam supplied into the housing to first and second beam profiles, a selector driving member configured to move each of the first and second optical elements between an advanced position and a retracted position relative to a luminous flux, and a control device configured to control the selector driving member to selectively shift to a first mode to maintain the first and second optical elements at the retracted position, a second mode to maintain only the first optical element at the advanced position, and a third mode to maintain only the second optical element at the advanced position, the control device being configured to stop the laser beam when the first and second optical elements move.

5 Claims, 14 Drawing Sheets

(51) Int. Cl.
  *G02B 5/00* (2006.01)
  *G02B 27/09* (2006.01)

(56) References Cited

U.S. PATENT DOCUMENTS

| | | |
|---|---|---|
| 2013/0148925 A1 | 6/2013 | Muendel et al. |
| 2014/0072003 A1* | 3/2014 | Matsumoto ........ B23K 26/1462 372/26 |
| 2016/0116679 A1 | 4/2016 | Muendel et al. |
| 2019/0134367 A1 | 5/2019 | Shiga et al. |
| 2019/0144325 A1* | 5/2019 | Bowden .................. C03B 33/04 219/121.69 |
| 2020/0189029 A1 | 6/2020 | Ishiguro et al. |

FOREIGN PATENT DOCUMENTS

| | | | | |
|---|---|---|---|---|
| DE | 10215446 A1 | * | 11/2003 | ......... B23K 26/0648 |
| DE | 202011052291 U1 | * | 3/2012 | ........... B23K 26/046 |
| JP | 2015500571 A | | 1/2015 | |
| JP | 2017001097 A | * | 1/2017 | |
| KR | 2012 0116834 A | | 10/2012 | |
| WO | 2012/157355 A1 | | 11/2012 | |
| WO | 2018/020911 A1 | | 2/2018 | |
| WO | 2018/235509 A1 | | 12/2018 | |

OTHER PUBLICATIONS

Machine translation of DE102154461-A1 (Year: 2024).*
Machine translation of DE202011052291U1 (Year: 2024).*
Office Action for corresponding Japanese Application No. 2019-009101 dated Feb. 14, 2020, with English language translation.
Office Action for corresponding Japanese Application No. 2019-009101 dated Sep. 11, 2020, with English language translation.
International Search Report for corresponding Application No. PCT/JP2020/000692, mailed Mar. 3, 2020.
Partial Supplementary European Search Report for corresponding EP Application No. 20745526.2 dated Mar. 9, 2022.

* cited by examiner

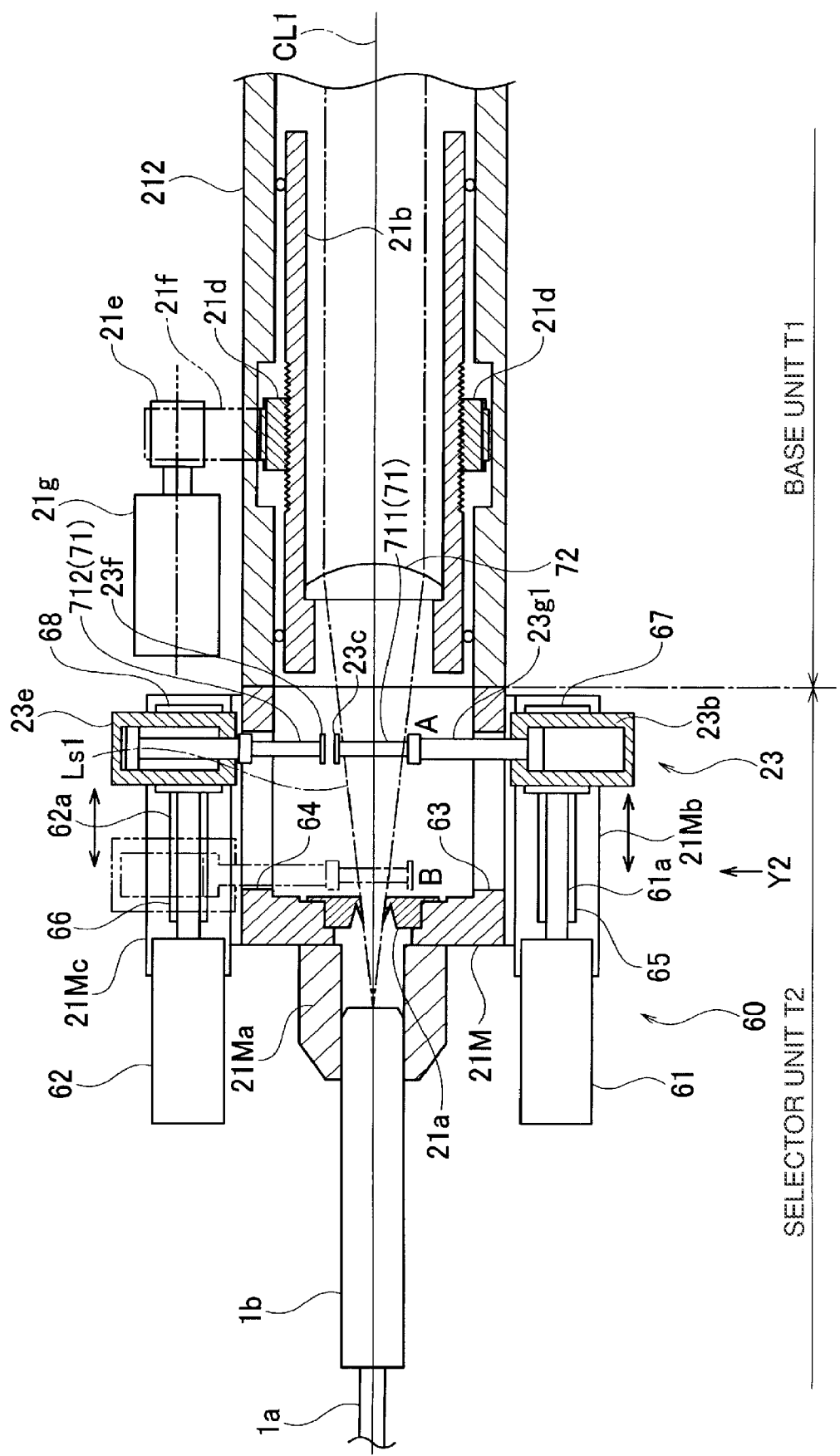

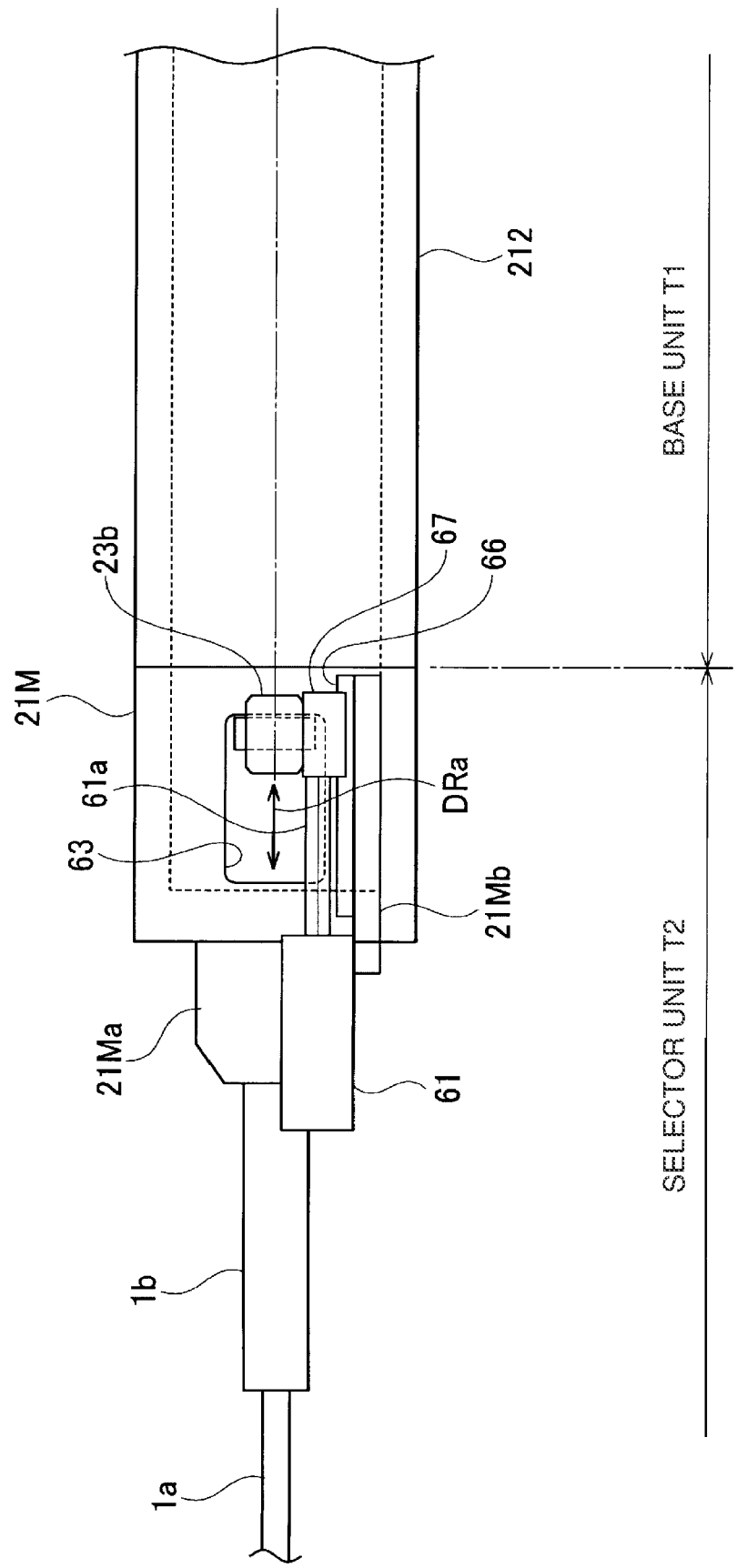

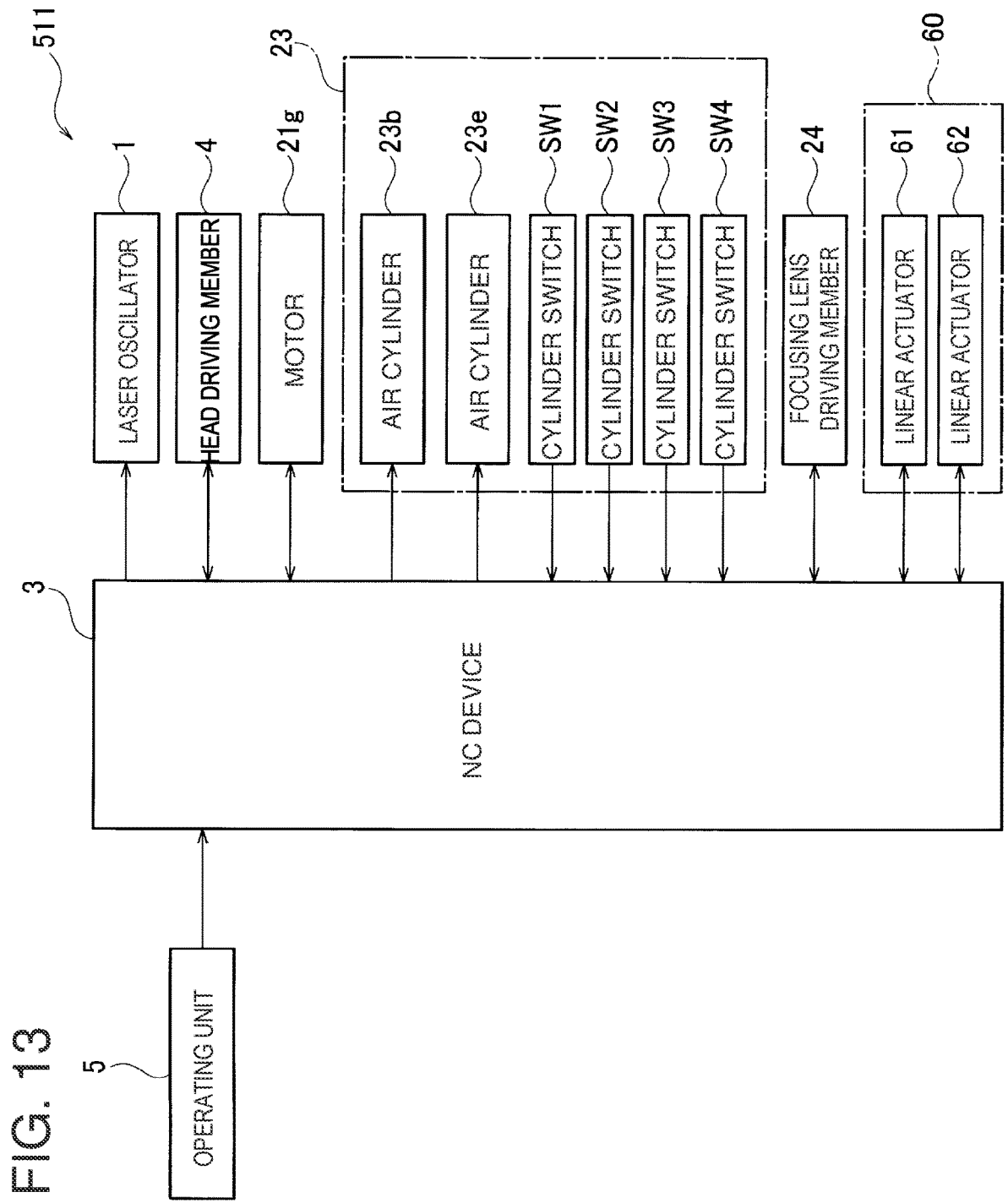

LASER MACHINING APPARATUS AND LASER MACHINING HEAD

TECHNICAL FIELD

The present disclosure relates to a laser machining apparatus and a laser machining head.

BACKGROUND ART

In Patent Literature 1, described is an optical device that changes an optical intensity distribution (hereinafter, referred to as a beam profile) of a laser beam with which a workpiece is irradiated in laser machining.

CITATION LIST

Patent Literature

Patent Literature 1: Japanese Translation of PCT International Application Publication No. 2015-500571

SUMMARY

An optical device that changes a beam profile as described in Patent Literature 1 includes a complicated configuration.

It is desired that the optical device capable of changing the beam profile with a simple configuration is mounted in a laser machining apparatus, and a user can easily select a beam profile of a laser beam from a plurality of beam profiles in laser machining.

Therefore, an object to be achieved by the present disclosure is to provide a laser machining apparatus and a laser machining head in which a beam profile of a laser beam can be changed with a simple configuration, and a user can easily select the beam profile of the laser beam from a plurality of beam profiles.

According to a first aspect of one or more embodiments, provided is a laser machining apparatus including a laser oscillator configured to output a laser beam, a laser machining head including a housing, a first optical element and a second optical element configured to change a beam profile of a luminous flux to a first beam profile and a second beam profile, respectively, in a case where the luminous flux of laser beams output from the laser oscillator and coming into the housing passes through the optical elements, a selector driving member provided in the housing, the first optical element and the second optical element being attached to the selector driving member, the selector driving member being configured to independently move the first optical element and the second optical element between an advanced position where each of the first optical element and the second optical element is advanced into the luminous flux and a retracted position where each of the first optical element and the second optical element is retracted from the luminous flux, and a control device configured to operate the selector driving member to selectively shift to a first mode to maintain both the first optical element and the second optical element at the retracted position, a second mode to maintain the first optical element at the advanced position and the second optical element at the retracted position, and a third mode to maintain the first optical element at the retracted position and the second optical element at the advanced position, the control device being configured to stop the output of the laser beam when the first optical element and the second optical element move between the advanced position and the retracted position.

It is preferable in the first aspect that the laser beam is supplied from the laser oscillator to the housing through a fiber cable and a coupler, the laser machining head includes a base unit not including the coupler and the selector driving member, and a selector unit including the coupler and the selector driving member, and the selector unit is detachably attached to the base unit.

It is further preferable in the first aspect that the first optical element is an axicon lens, and the second optical element is a facet lens.

It is also preferable in the first aspect to include a selector optical axis direction moving member configured to move at least one of the first optical element and the second optical element in a direction parallel to an optical axis of the luminous flux.

According to a second aspect of one or more embodiments, provided is a laser machining head including a housing, a first optical element and a second optical element configured to change a beam profile of a luminous flux to a first beam profile and a second beam profile, respectively, in a case where the luminous flux of laser beams coming from outside into the housing passes through the optical elements, the laser machining head including the first optical element and the second optical element, a selector driving member configured to independently move the first optical element and the second optical element between an advanced position where each of the first optical element and the second optical element is advanced into the luminous flux and a retracted position where each of the first optical element and the second optical element is retracted from the luminous flux, and a selector optical axis direction moving member configured to move at least one of the first optical element and the second optical element in a direction parallel to an optical axis of the luminous flux.

According to one or more embodiments, the beam profile of the laser beam can be changed with a simple configuration, and a user can easily select the beam profile of the laser beam from a plurality of beam profiles.

BRIEF DESCRIPTION OF DRAWINGS

FIG. 11 is a longitudinal sectional view for explaining the selector unit T2 including a selector optical axis direction moving member 60.

FIG. 12 is a side view seen from an arrow Y2 in FIG. 11.

FIG. 13 is a block diagram showing a configuration of a laser machining apparatus 511 including the selector optical axis direction moving member 60.

DESCRIPTION OF EMBODIMENT

A laser machining head and a laser machining apparatus according to the present embodiment will be described by means of a laser machining head 2 and a laser machining apparatus 51.

Figure 1:
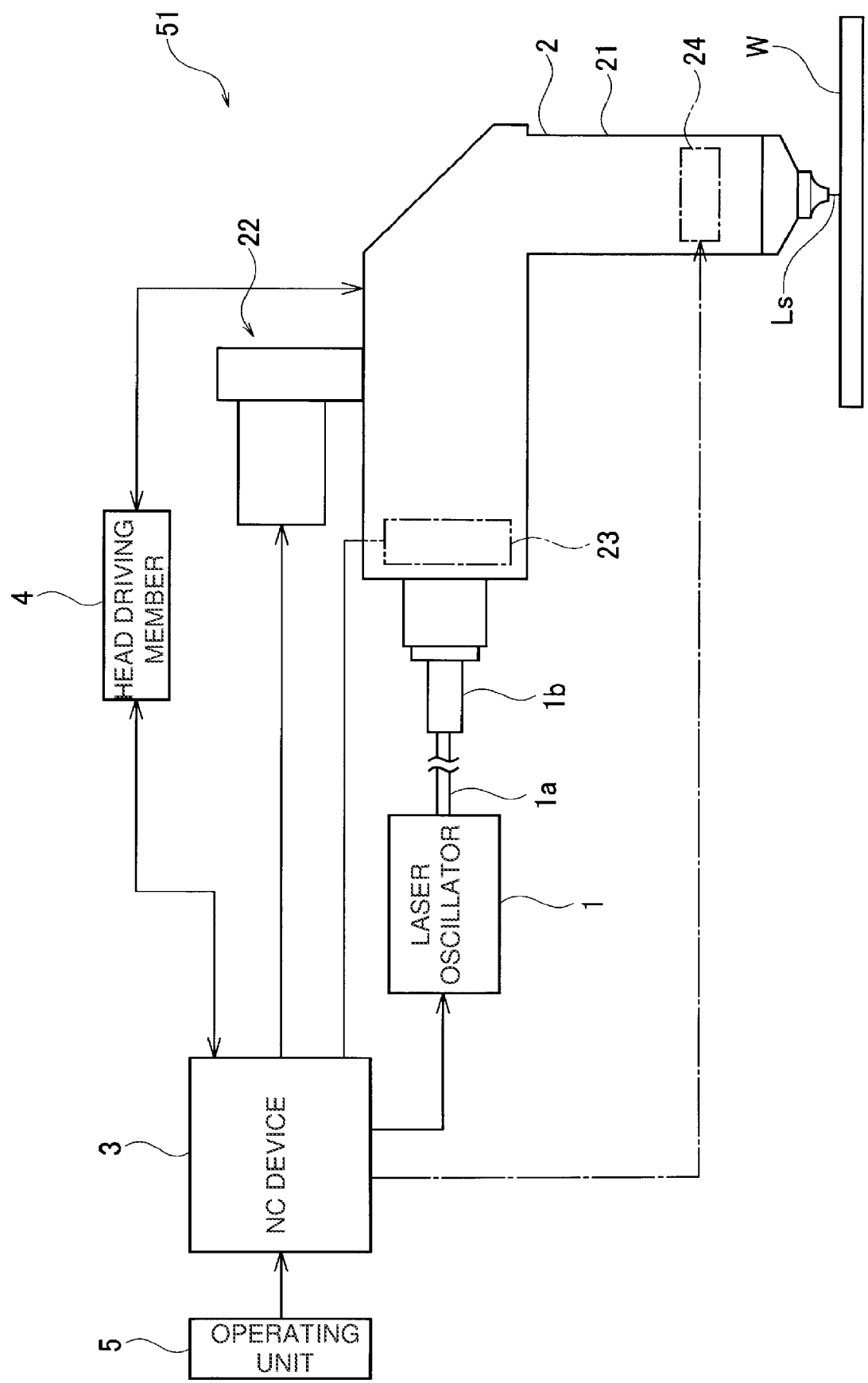
FIG. 1 is a diagram showing an entire configuration of a laser machining apparatus 51 that is an example of a laser machining apparatus according to an embodiment of the present disclosure.

FIG. 1 is a diagram showing an entire configuration of the laser machining apparatus 51.

The laser machining apparatus 51 includes a laser oscillator 1, the laser machining head 2, an NC device 3 that is a control device, a head driving member 4, and an operating unit 5.

The laser oscillator 1 generates a laser beam Ls having a wavelength of 1 μm band, for example, with a fiber laser. The generated laser beam Ls is supplied to the laser machining head 2 through a fiber cable 1a and a coupler 1b. The laser oscillator 1 is not limited to a fiber laser oscillator, and may be a solid laser oscillator, a direct diode laser oscillator or the like. Note that the wavelength of 1 μm band includes a wavelength of 1.06 μm to 1.08 μm, and indicates a wavelength band of 0.9 μm or more and 1.1 μm or less.

As shown in FIG. 1, the laser machining head 2 includes a housing 21, a collimate lens driving member 22, a selector driving member 23, and a focusing lens driving member 24.

Figure 2:
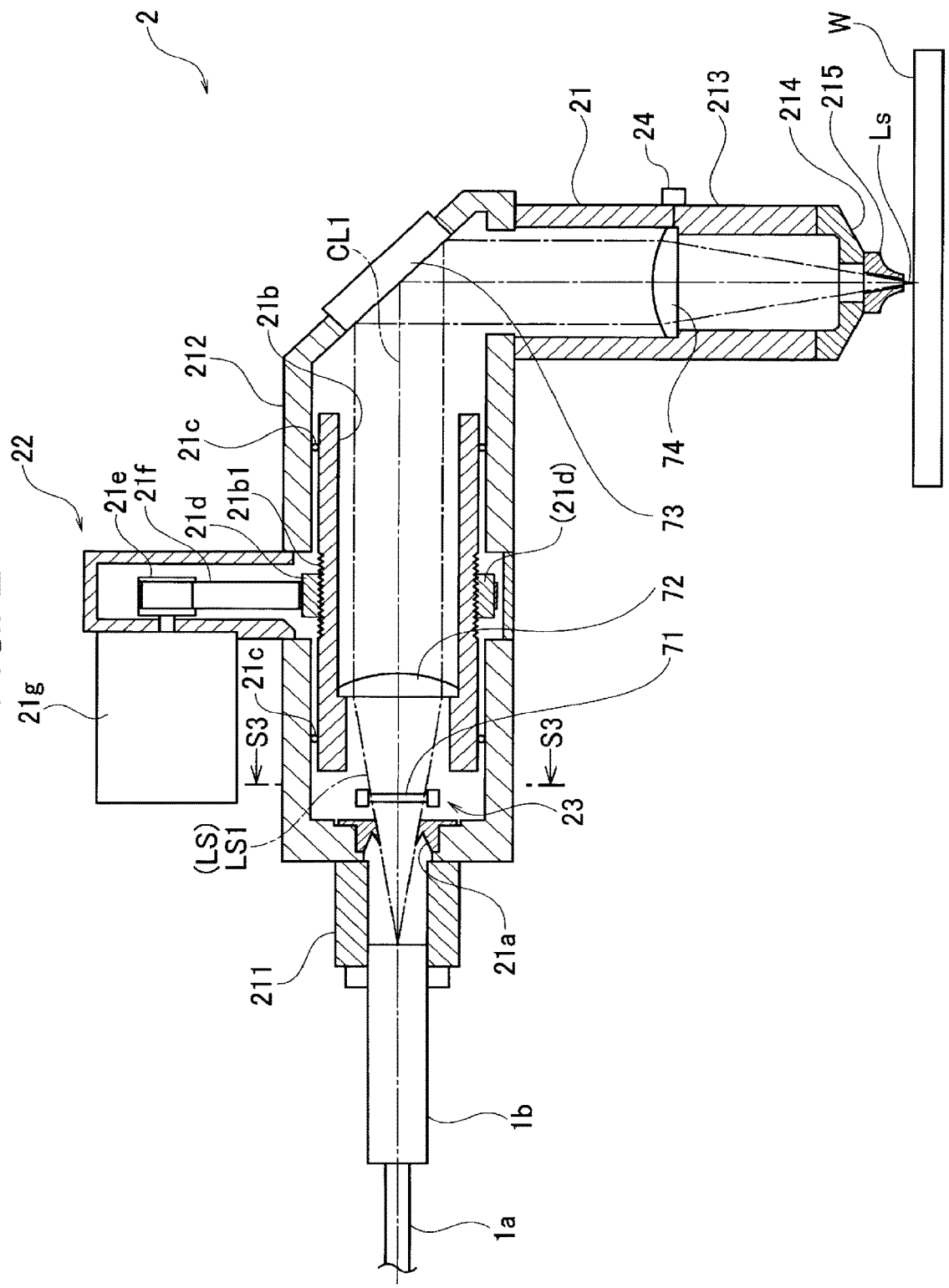
FIG. 2 is a longitudinal sectional view of a laser machining head 2 provided in the laser machining apparatus 51.

FIG. 2 is a longitudinal sectional view showing a detailed configuration of the laser machining head 2. As shown in FIG. 2, the housing 21 is formed in an L-shape.

The housing 21 includes an upstream housing 211 to which the coupler 1b is connected, a square tubular midstream housing 212 connected to the upstream housing, and a square tubular downstream housing 213 orthogonally connected to the midstream housing 212.

A nozzle holder 214 is attached to a tip end of the downstream housing 213, and a nozzle 215 is detachably attached to the nozzle holder 214.

In the housing 21, an aperture 21a, a collimate lens 72, a bend mirror 73 and a focusing lens 74 are arranged from a coupler 1b side. Also, the selector driving member 23 is disposed between the aperture 21a and the collimate lens 72.

The selector driving member 23 includes an optical element 71 for changing a beam profile.

The laser beam Ls supplied from the laser oscillator 1 is emitted as a divergent beam from the coupler 1b into the housing 21. The emitted laser beam Ls passes through an opening 21a1 of the aperture 21a and the collimate lens 72 and is reflected by the bend mirror 73, and the laser beam Ls reflected by the bend mirror 73 enters into the focusing lens 74. The laser beam Ls focused by the focusing lens 74 is emitted from the nozzle 215 toward a work W that is a workpiece, and is focused at a predetermined focus position.

The selector driving member 23 advances and retracts the optical element 71 that changes the beam profile of the laser beam Ls supplied from the laser oscillator 1, between an advanced position where the optical element 71 is advanced into a luminous flux Ls1 of laser beams Ls and a retracted position where the optical element 71 is retracted from the luminous flux. The selector driving member 23 will be described later in detail.

As shown in FIG. 2, the collimate lens 72 is held by a cylindrical collimate lens holder 21b being movable in a direction of an optical axis CL1 of the laser beam Ls in the housing 21. The collimate lens holder 21b includes an external thread portion 21b1 with external threads formed thereon, at a central position of an outer periphery in an axial direction.

A seal ring 21c is disposed between the collimate lens holder 21b and the housing 21.

The external thread portion 21b1 is screwed with a ring nut 21d including internal threads, movement of the ring nut in the direction of the optical axis CL1 being regulated. A timing belt 21f is wound around an outer periphery of the ring nut 21d.

The timing belt 21f is also wound around a pulley 21e attached to a drive shaft of a motor 21g.

According to this configuration, the ring nut 21d is rotated by rotating the motor 21g, and the collimate lens holder 21b moves together with the collimate lens 72 in the direction of the optical axis CL1.

The focusing lens 74 is moved in the direction of the optical axis CL1 by an operation of the focusing lens driving member 24. Through the movement of the focusing lens 74 in the direction of the optical axis CL1, the focus position of the laser beam Ls emitted outward from the nozzle 215 is adjusted.

Figure 3A:
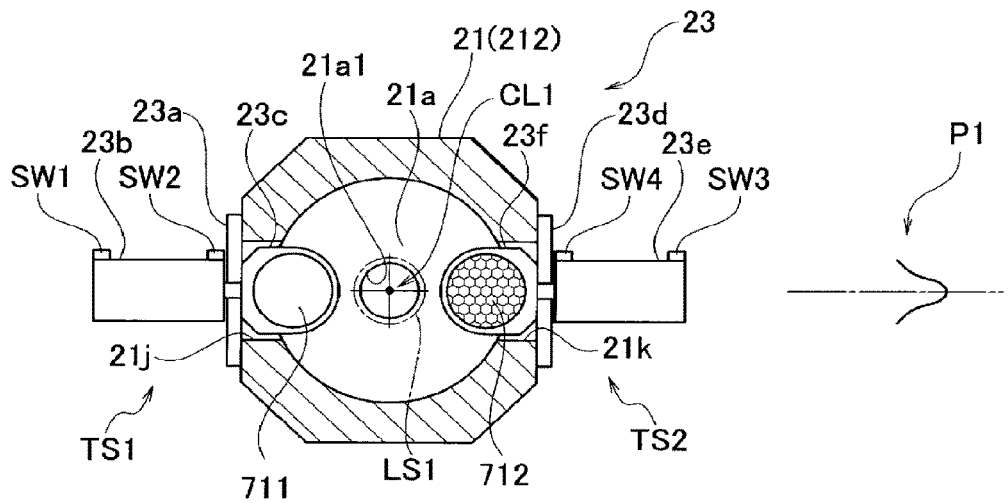
FIG. 3A is a sectional view at a position S3-S3 in FIG. 2 for explaining an operation of a selector driving member 23, showing a state in a gaussian mode M1.
Figure 3B:
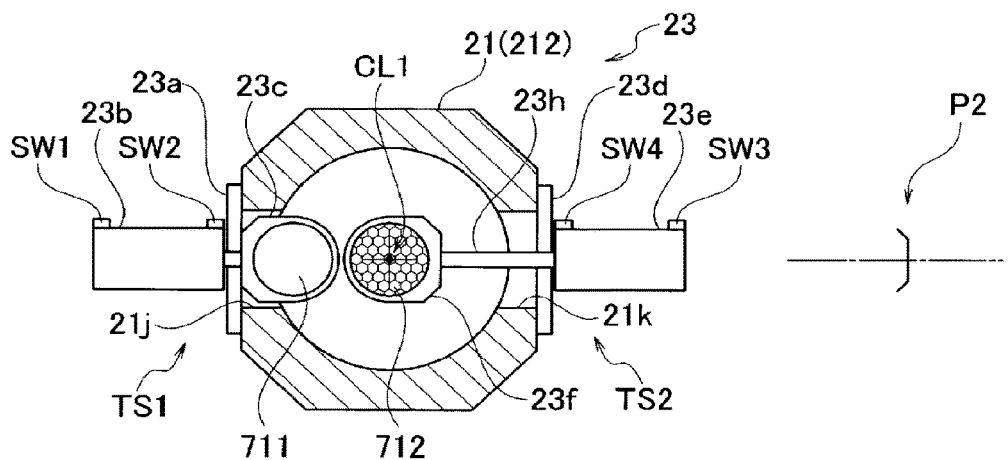
FIG. 3B is a sectional view at the position S3-S3 in FIG. 2 for explaining the operation of the selector driving member 23, showing a state in a flat mode M2.
Figure 3C:
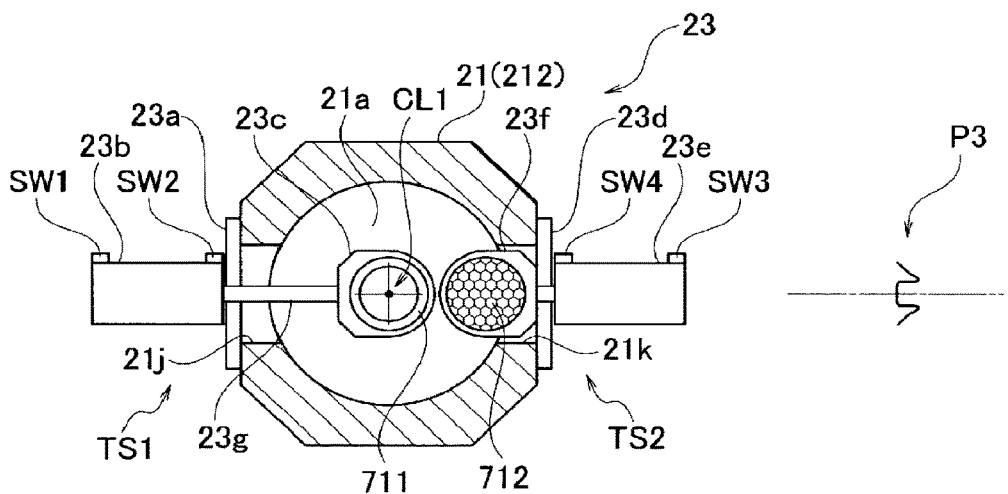
FIG. 3C is a sectional view at the position S3-S3 in FIG. 2 for explaining the operation of the selector driving member 23, showing a state in a ring mode M3.

FIG. 3A to FIG. 3C are cross sectional views of the selector driving member 23 seen from a collimate lens 72 side at a position S3-S3 in FIG. 2.

As shown in FIG. 3A to FIG. 3C, the selector driving member 23 includes two mode switch units TS1 and TS2 arranged at opposite positions in a radial direction across the optical axis CL1.

In the midstream housing 212 of the housing 21, openings 21j and 21k are formed at opposite positions across the optical axis CL1.

The mode switch unit TS1 includes a base plate 23a, an air cylinder 23b, and a lens mount 23c.

The mode switch unit TS2 includes a base plate 23d, an air cylinder 23e, and a lens mount 23f.

An axicon lens 711 is attached as a first optical element to the lens mount 23c of the mode switch unit TS1, and a facet lens 712 is attached as a second optical element to the lens mount 23f of the mode switch unit TS2.

The lens mounts 23c and 23f are attached to tip ends of cylinder rods 23g and 23h of the air cylinders 23b and 23e. The air cylinders 23b and 23e are attached to the base plates 23a and 23d, respectively. The base plates 23a and 23d are attached to opposite positions on an outer surface of the midstream housing 212.

The lens mount 23c of the mode switch unit TS1 is moved in the radial direction away from and close to the optical axis CL1 through the opening 21j by an operation of the air cylinder 23b. Specifically, the lens mount 23c moves between the retracted position and the advanced position. The retracted position is a position where the axicon lens 711 does not cover the luminous flux Ls1 as shown in FIG. 3A and FIG. 3B. The advanced position is a position where the lens mount is advanced into an optical path so that the axicon lens 711 covers the whole luminous flux Ls1 as shown in FIG. 3C.

The air cylinder 23b includes two cylinder switches SW1 and SW2 that turn on and off in accordance with a position of the cylinder rod 23g.

The cylinder switch SW1 turns on when the cylinder rod 23g is retracted and the axicon lens 711 is at the retracted position, and the switch turns off when the lens is not at the retracted position.

The cylinder switch SW2 turns on when the cylinder rod 23g extends outward and the axicon lens 711 is at the advanced position, and the switch turns off when the lens is not at the advanced position.

At least the axicon lens 711 at the advanced position has a center position substantially aligned with the optical axis CL1.

The lens mount 23f of the mode switch unit TS2 is moved in the radial direction away from and close to the optical axis CL1 through the opening 21k by an operation of the air cylinder 23e. Specifically, the lens mount 23f moves between the retracted position and the advanced position. The retracted position is a position where the facet lens 712 does not cover the luminous flux Ls1 as shown in FIG. 3A and FIG. 3C. The advanced position is a position where the facet lens 712 is advanced into the optical path to cover the whole luminous flux Ls1 as shown in FIG. 3B.

The air cylinder 23e includes two cylinder switches SW3 and SW4 that turn on and off in accordance with a position of the cylinder rod 23h.

The cylinder switch SW3 turns on when the cylinder rod 23h is retracted and the facet lens 712 is at the retracted position, and the switch turns off when the lens is not at the retracted position.

The cylinder switch SW4 turns on when the cylinder rod 23h extends outward and the facet lens 712 is at the advanced position, and the switch turns off when the lens is not at the advanced position.

According to the above described configuration, the selector driving member 23 can selectively shift to three modes. The beam profile of the laser beam Ls is changed to different types in the respective modes.

The three modes are a gaussian mode M1, a flat mode M2, and a ring mode M3, and may be referred to as a first mode M1, a second mode M2, and a third mode M3, respectively.

The laser machining head 2 and the laser machining apparatus 51 including the head can emit the laser beam Ls from the nozzle 215 with the beam profile corresponding to one mode selected from the three modes of the first to third modes M1 to M3.

FIG. 3A shows the first mode M1. In this mode, the beam profile is a basic beam profile of a gaussian type P1. The first mode M1 is obtainable in a state where both the axicon lens 711 and the facet lens 712 do not cover the luminous flux Ls1. In the gaussian type P1, an optical intensity distribution is a normal distribution in the radial direction around the optical axis CL1.

FIG. 3B shows the second mode M2. In this mode, the beam profile is a first beam profile different from the basic beam profile, and is of a flat type P2. The second mode M2 is obtainable in a state where the facet lens 712 covers the luminous flux Ls1. In the flat type P2, the optical intensity distribution is substantially flat in a circular range including the optical axis CL1.

FIG. 3C shows the third mode M3. In this mode, the beam profile is a second beam profile of a ring type P3. The third mode M3 is obtainable in a state where the axicon lens 711 covers the luminous flux Ls1. In the ring type P3, the optical intensity distribution is maximum at a predetermined radius position around the optical axis CL1.

The head driving member 4 moves the laser machining head 2 independently in respective directions of three axes in total including two axes parallel to and one axis orthogonal to the work W (see FIG. 1 and FIG. 2) mounted on an unshown worktable.

The operating unit 5 is provided as a device for an operator to input data or an operation instruction into the NC device 3.

Figure 4:
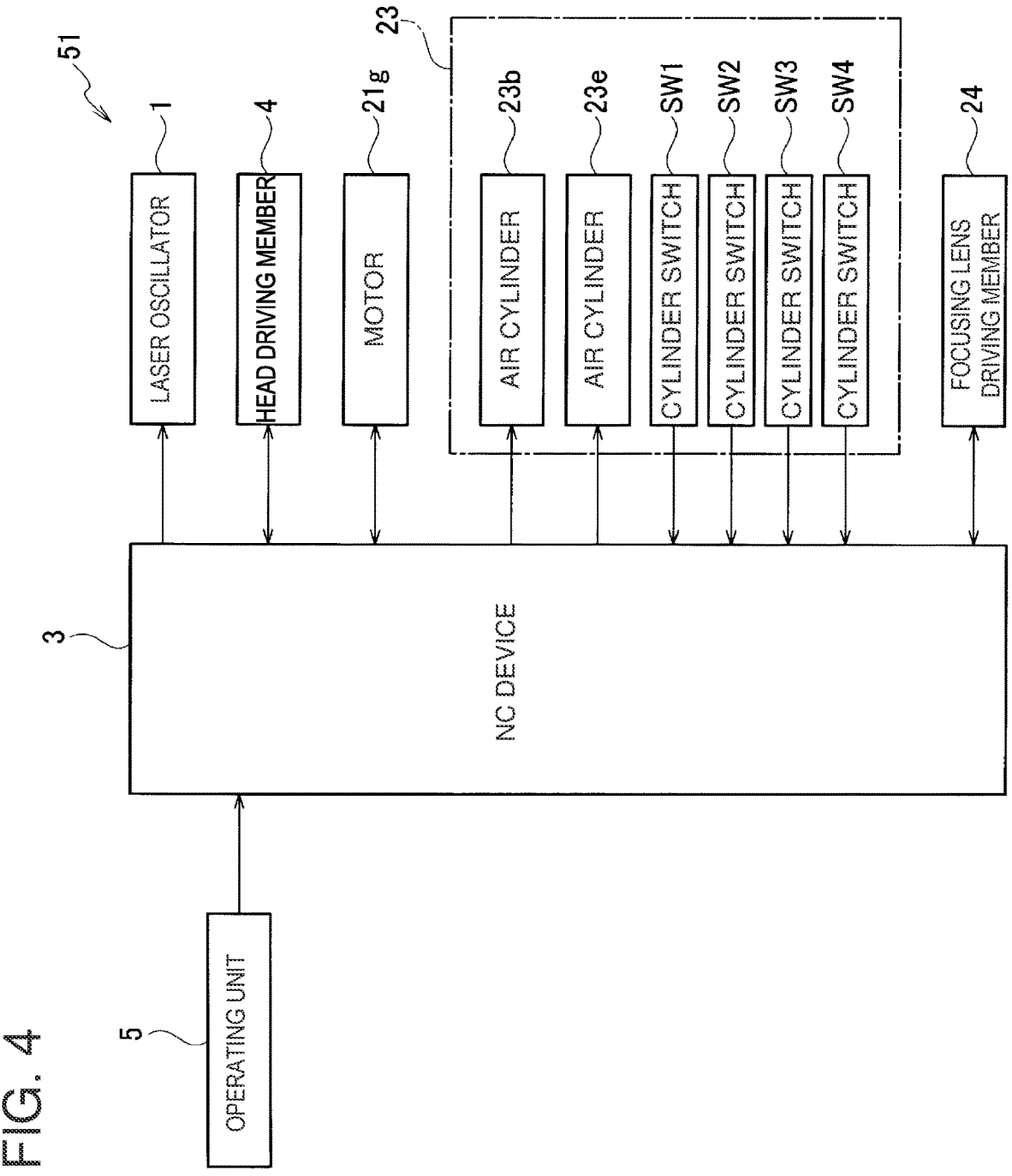
FIG. 4 is a block diagram showing a configuration of the laser machining apparatus 51.

FIG. 4 is a block diagram showing the configuration of the laser machining apparatus 51.

The NC device 3 controls operations of the laser oscillator 1, the head driving member 4 and the motor 21g, and the operations of the air cylinders 23b and 23e and the focusing lens driving member 24.

To the NC device 3, an ON/OFF state of each of the cylinder switches SW1 to SW4 and operation states of the head driving member 4 and the focusing lens driving member 24 are fed back. Further, to the NC device 3, operation information input from the operating unit 5 is supplied.

The NC device 3 selectively sets the mode of the selector driving member 23 from three modes that will be next described with reference to FIG. 5 to FIG. 7 so that the beam profile suitable for content of machining to be applied to the work W is obtainable, and the device executes laser machining.

It is instructed which mode is to be selected from the three modes, in response to operator's input from the operating unit 5, or in accordance with a processing program supplied from outside in advance.

In an example described below, in a basic state where the selector driving member 23 is at a home position, the first mode M1 is set in which both the axicon lens 711 and the facet lens 712 are retracted from the luminous flux Ls1, and the laser oscillator 1 stops output of the laser beam Ls.

The first mode M1 is applied mainly to piercing and sheet processing.

The second mode M2 is applied mainly to high-quality cutting for low surface roughness of a stainless steel material.

The third mode M3 is applied mainly to medium-thick plate processing.

Figure 5:
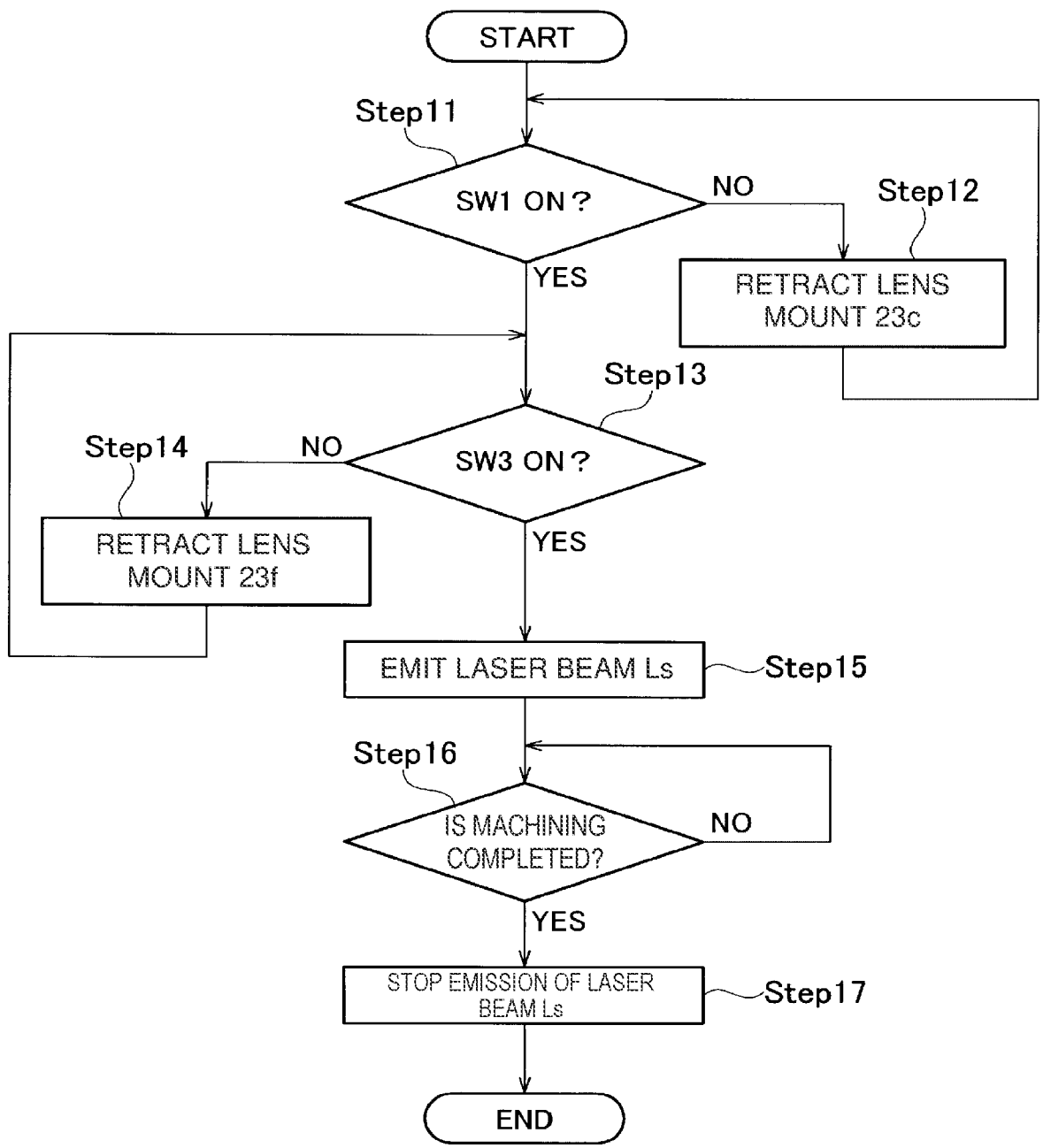
FIG. 5 is a flowchart showing an operation of setting the selector driving member 23 to the state of the gaussian mode M1 to perform laser machining.

(1) First Mode M1 (Gaussian Mode) [see FIG. 5]

First, the NC device 3 determines whether or not the cylinder switch SW1 is on (Step 11).

In a case where the determination of Step 11 is no, the NC device 3 operates the air cylinder 23b to retract the lens mount 23c from the luminous flux Ls1 (Step 12).

In a case where the determination of Step 11 is yes, the NC device 3 determines whether or not the cylinder switch SW3 is on (Step 13).

In a case where the determination of Step 13 is no, the NC device 3 operates the air cylinder 23e to retract the lens mount 23f from the luminous flux Ls1 (Step 14).

In a case where the determination of Step 13 is yes, the NC device 3 operates the laser oscillator 1 to emit the laser beam Ls (Step 15).

The NC device 3 determines whether or not the laser machining is completed (Step 16).

In a case where the determination of Step 16 is no, the emission of the laser beam Ls is maintained, and in a case where the determination of Step 16 is yes, the emission of the laser beam Ls is stopped (Step 17), thereby ending a series of processes.

Figure 6:
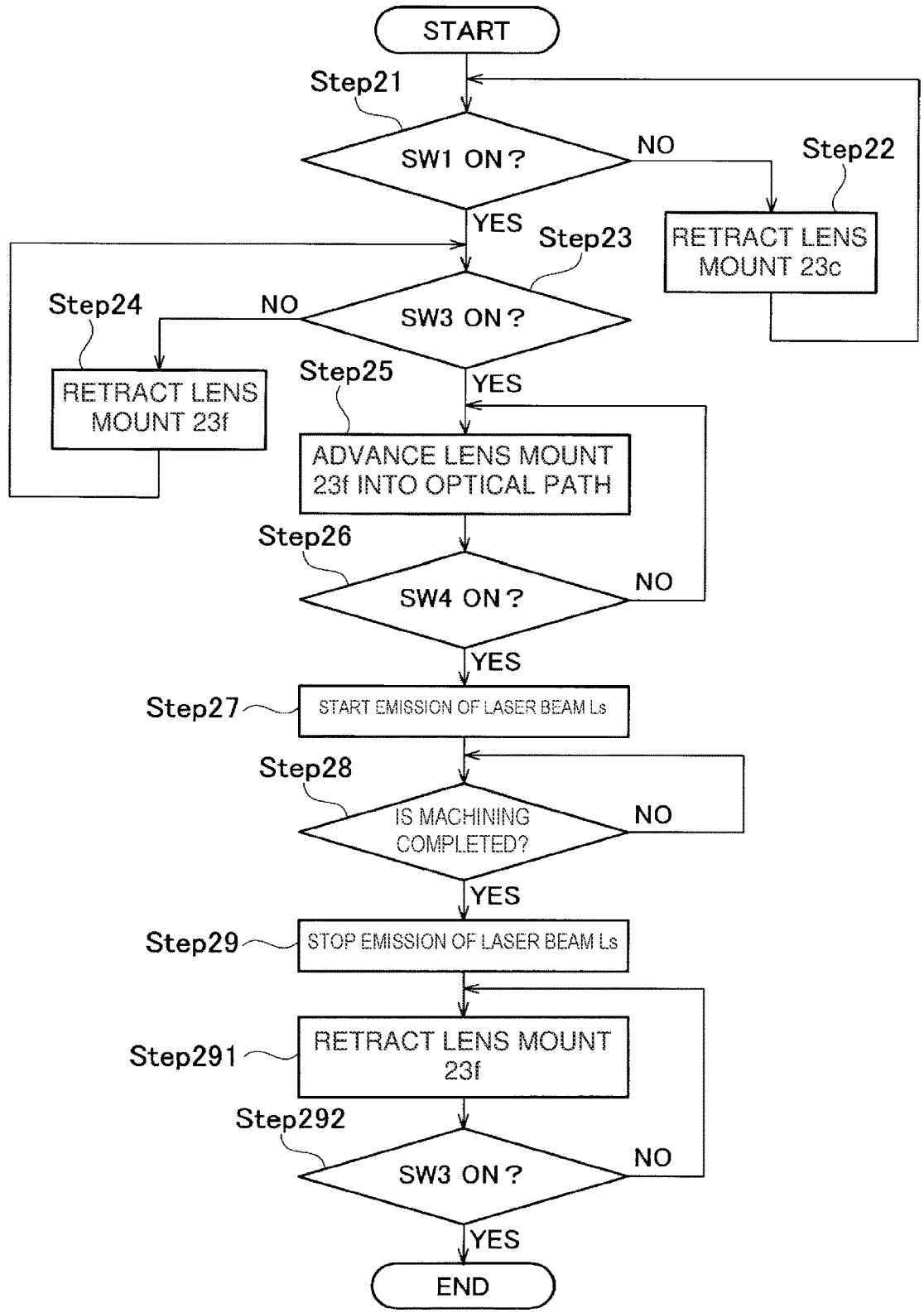
FIG. 6 is a flowchart showing an operation of setting the selector driving member 23 to the state of the flat mode M2 to perform the laser machining.

(2) Second Mode M2 (Flat Mode) [see FIG. 6]

First, the NC device 3 determines whether or not the cylinder switch SW1 is on (Step 21).

In a case where the determination of Step 21 is no, the NC device 3 operates the air cylinder 23b to move the lens mount 23c to the retracted position where the lens mount 23c is retracted from the luminous flux Ls1 (Step 22).

In a case where the determination of Step 21 is yes, the NC device 3 determines whether or not the cylinder switch SW3 is on (Step 23).

In a case where the determination of Step 23 is no, the NC device 3 operates the air cylinder 23e to move the lens mount 23f to the retracted position where the lens mount 23f is retracted from the luminous flux Ls1, thereby obtaining the basic state (Step 24).

In a case where the determination of Step 23 is yes, the NC device 3 operates the air cylinder 23e to move the lens mount 23f to the advanced position so that the facet lens 712 covers the luminous flux Ls1 (Step 25).

The NC device 3 determines whether or not the cylinder switch SW4 has turned on (Step 26).

In a case where the determination of Step 26 is no, the NC device 3 determines that the lens mount fails to move, and executes Step 25 again.

In a case where the determination of Step 26 is yes, the NC device 3 operates the laser oscillator 1 to emit the laser beam Ls (Step 27).

The NC device 3 determines whether or not the laser machining is completed, from a progress situation of the processing program (Step 28).

In a case where the determination of Step 28 is no, the emission of the laser beam Ls is maintained, and in a case where the determination is yes, the emission of the laser beam Ls is stopped (Step 29).

After executing Step 29, the NC device 3 operates the air cylinder 23e to move the lens mount 23f to the retracted position (Step 291).

The NC device 3 determines whether or not the cylinder switch SW3 has turned on (Step 292).

In a case where the determination of Step 292 is no, the NC device 3 determines that the lens mount fails to move, and executes Step 291 again.

In a case where the determination of Step 292 is yes, the NC device 3 determines that the facet lens 712 returns to the retracted position and is in the basic state, to end a series of processes.

Figure 7:
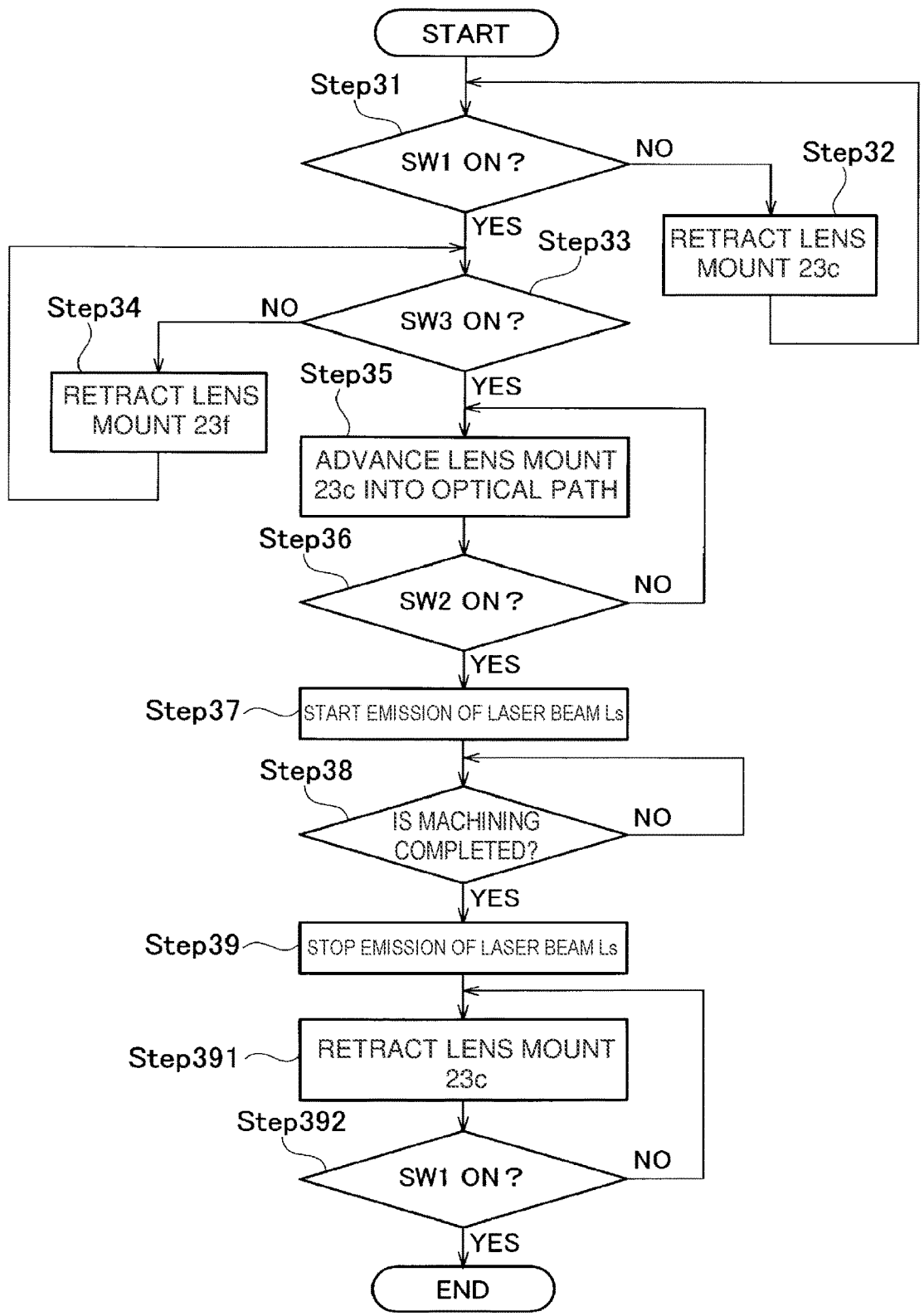
FIG. 7 is a flowchart showing an operation of setting the selector driving member 23 to the state of the ring mode M3 to perform the laser machining.

(3) Third Mode M3 (Ring Mode) [see FIG. 7]

First, the NC device 3 determines whether or not the cylinder switch SW1 is on (Step 31).

In a case where the determination of Step 31 is no, the NC device 3 operates the air cylinder 23b to move the lens mount 23c to the retracted position where the lens mount 23c is retracted from the luminous flux Ls1 (Step 32).

In a case where the determination of Step 31 is yes, the NC device 3 determines whether or not the cylinder switch SW3 is on (Step 33).

In a case where the determination of Step 33 is no, the NC device 3 operates the air cylinder 23e to move the lens mount 23f to the retracted position where the lens mount 23f is retracted from the luminous flux Ls1, thereby obtaining the basic state (Step 34).

In a case where the determination of Step 33 is yes, the NC device 3 operates the air cylinder 23b, and moves the lens mount 23c to the advanced position so that the axicon lens 711 covers the luminous flux Ls1 (Step 35).

The NC device 3 determines whether or not the cylinder switch SW2 has turned on (Step 36).

In a case where the determination of Step 36 is no, the NC device 3 determines that the lens mount fails to move, and executes (Step 35) again.

In a case where the determination of Step 36 is yes, the NC device 3 operates the laser oscillator 1 to emit the laser beam Ls (Step 37).

The NC device 3 determines whether or not the laser machining is completed, from the progress situation of the processing program (Step 38).

In a case where the determination of Step 38 is no, the emission of the laser beam Ls is maintained, and in a case where the determination is yes, the emission of the laser beam Ls is stopped (Step 39).

After executing Step 39, the NC device 3 operates the air cylinder 23b to move the lens mount 23c to the retracted position (Step 391).

The NC device 3 determines whether or not the cylinder switch SW1 has turned on (Step 392).

In a case where the determination of Step 392 is no, the NC device 3 determines that the lens mount fails to move, and executes Step 391 again.

In a case where the determination of Step 392 is yes, the NC device 3 determines that the axicon lens 711 returns to the retracted position and is in the basic state, to end a series of processes.

As described above, the NC device 3 stops irradiation with the laser beam Ls, when moving the axicon lens 711 and the facet lens 712 between the retracted position and the advanced position. That is, the laser beam Ls is supplied from the laser oscillator 1 to the laser machining head 2 only in a case where one of the axicon lens 711 and the facet lens 712 stands still at a position where the lens covers the whole luminous flux Ls1 and a case where both the lenses stand still at the retracted position where the lenses do not cover the luminous flux Ls1.

Consequently, a defect is prevented that the lens mounts 23c and 23f cross the laser beam Ls being passing through the housing 21 and that a reflected beam of the laser beam Ls reflected by the lens mount 23c reaches an unnecessary region in the housing 21. Also, a defect is prevented that the laser beam Ls with which the work W is irradiated becomes unstable to affect machining accuracy, finish or the like.

In the second mode M2, the facet lens 712 at the advanced position does not have to have a center completely aligned with a center of the luminous flux Ls1 of the laser beams Ls. That is, when the whole luminous flux Ls1 passes through the facet lens 712, slight deviation of the center does not cause any practical defects.

On the other hand, it is desirable in the third mode M3 that the axicon lens 711 at the advanced position has a center accurately aligned with the center of the luminous flux Ls1 of the laser beams Ls. That is, in the ring type of beam profile obtainable by the axicon lens 711, a center position of a ring is required to coincide with a center position of the gaussian type of luminous flux Ls1 in the first mode M1 with high accuracy.

To solve the problem, the lens mount 23c to which at least the axicon lens 711 is attached in the selector driving member 23 may be supported by two rods in place of one rod.

Figure 8:
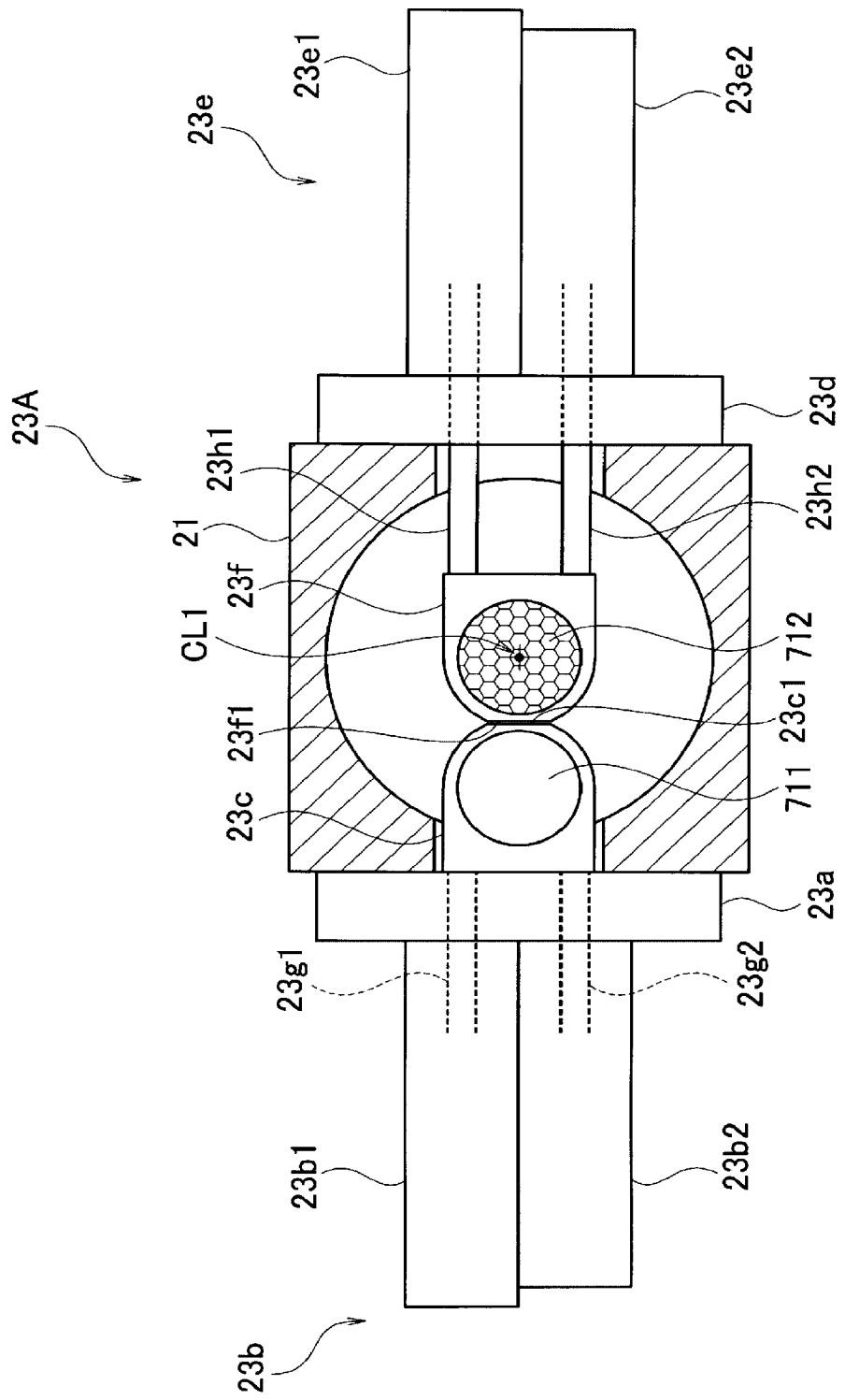
FIG. 8 is a sectional view at the position S3-S3 in FIG. 2, showing a selector driving member 23A that is Modification 1 of the selector driving member 23.

FIG. 8 shows a selector driving member 23A in which each of the lens mount 23c and the lens mount 23f is supported by two rods.

As shown in FIG. 8, the air cylinder 23b of the selector driving member 23A is configured by providing an air cylinder 23b1 and a linear guide 23b2 in parallel. Also, the air cylinder 23e of the selector driving member 23B is configured by providing an air cylinder 23e1 and a linear guide 23e2 in parallel.

The air cylinder 23b will be described as a representative. The lens mount 23c is supported by a cylinder rod 23g1 of the air cylinder 23b1, and a rod 23g2 of the linear guide 23b2 that is disposed in parallel with the cylinder rod 23g1 and moves in an axial direction of the rod.

The air cylinder 23b1 is configured to enable stroke adjustment of the cylinder rod 23g1. The lens mount 23c is also supported by the rod 23g2 accurately moving in the axial direction with high accuracy.

Consequently, a center of the axicon lens 711 at the advanced position is aligned with the optical axis CL1 of the laser beam Ls with high accuracy, and the position of the center can be maintained without being deflected. This configuration in FIG. 8 also applies to the lens mount 23f. The lens mount 23f is supported by a cylinder rod 23h1 of the air cylinder 23e1, and a rod 23h2 of the linear guide 23e2 that is disposed in parallel with the cylinder rod 23h1 and moves in an axial direction of the rod.

In the above described configuration, the focus position of the laser beam Ls to be emitted outward from the nozzle 215 can be adjusted by moving the focusing lens 74 as described above.

On the other hand, in a case where the focus position is moved by the operation of the selector driving member 23, the focus position can be adjusted by operating the collimate lens driving member 22 to move the collimate lens 72 in the direction of the optical axis CL1.

The laser machining head 2 including the selector driving member 23 or 23A mounted thereon and the laser machining apparatus 51 including the laser machining head 2 can change the beam profile of the laser beam Ls to be emitted from the nozzle 215 with such a simple configuration as described above. Also, a user of the laser machining apparatus 51 can easily select and set one of three types of beam profiles of the laser beam Ls without replacing the other optical elements.

The laser machining head 2 and the laser machining apparatus 51 can suitably change the beam profile of the laser beam Ls to be emitted from the nozzle 215 so that the beam profile corresponds to the machining content, without changing a position of the laser machining head 2 to the work W even in the middle of a series of laser machining processes. Consequently, the time required to change the beam profile can be short, and a drop in machining efficiency in response to the change of the beam profile can be inhibited.

The laser machining apparatus 51 including the laser machining head 2 automatically stops the emission of the laser beam Ls during an operation of changing the beam profile.

This can avoid defects such as damages and thermal deterioration caused by irradiation of an unnecessary region in the laser machining head 2 with the laser beam Ls, and a defect in a machined region of the work W caused by instability of the laser beam Ls emitted from the nozzle 215.

Consequently, long life of the laser machining head 2 can be acquired, and quality of a product to be obtained from the work W can be maintained.

The present disclosure is not limited to the above described configuration, and may include modifications without departing from the scope of the present disclosure.

The selector driving member 23 is not limited to an example in which two optical elements are selectively inserted into the luminous flux Ls1 of the laser beams Ls, and one of three or more optical elements may be selectively inserted.

Figure 9:
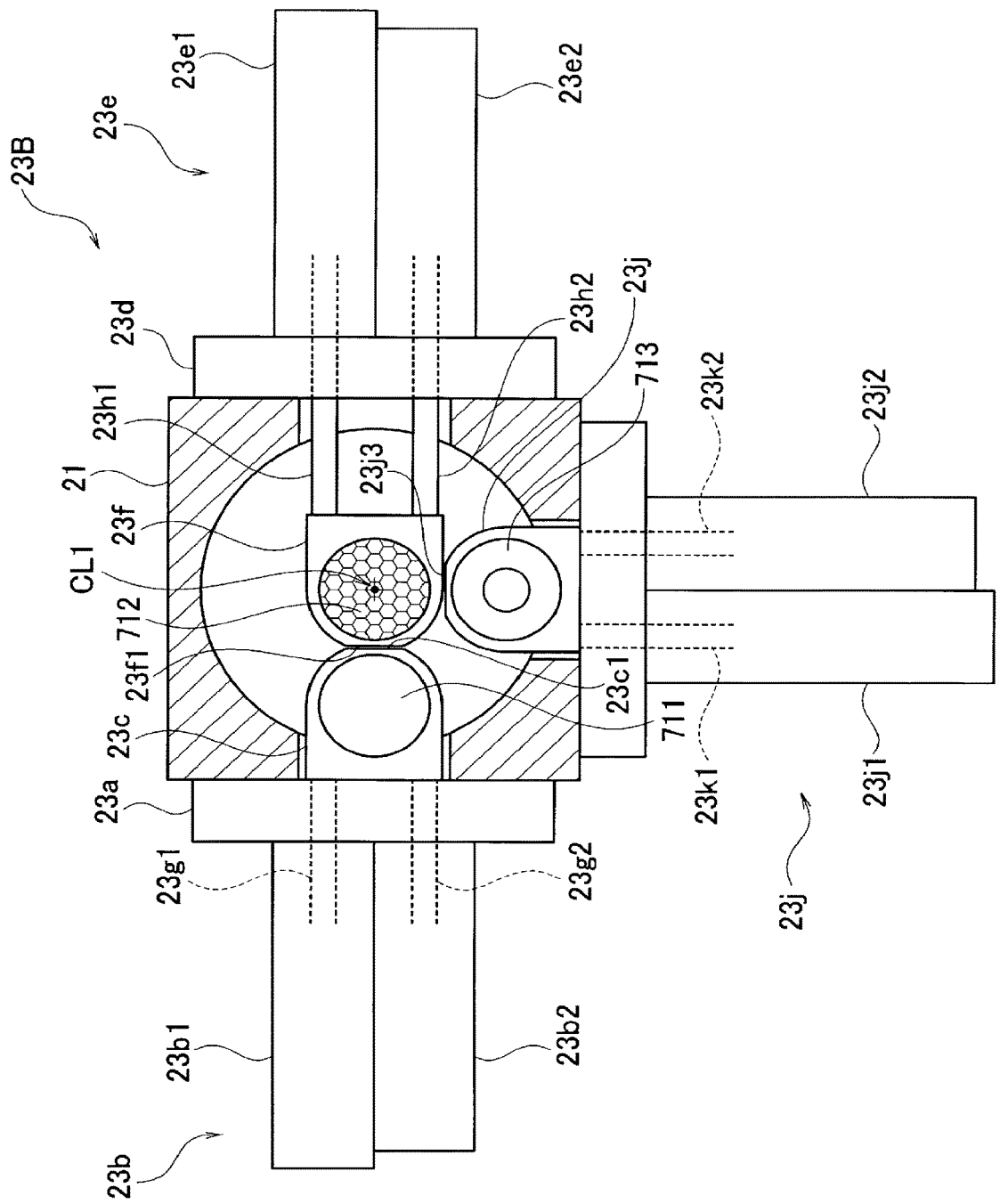
FIG. 9 is a sectional view at the position S3-S3 in FIG. 2, showing a selector driving member 23B that is Modification 2 of the selector driving member 23.

FIG. 9 shows an example, i.e., a selector driving member 23B as a modification in which one of three optical elements can be selectively inserted into a luminous flux Ls1.

The selector driving member 23B includes, unlike the selector driving member 23A, a lens mount 23j that moves in an orthogonal direction to a moving direction of lens mounts 23c and 23f.

The lens mount 23j is supported by two rods, i.e., a cylinder rod 23kl of an air cylinder 23j1 and a rod 23k2 of a linear guide 23j2 in the same manner as in the lens mounts 23c and 23f.

The cylinder rod 23kl is advanced into and retracted from the luminous flux Ls1 by an operation of the air cylinder 23j1. The rod 23k2 is a rod of the linear guide 23j2, and is coupled to the lens mounts 23c and 23f without being substantially deflected, to follow an operation of the cylinder rod 23k1.

The lens mount 23j holds an aperture 713. In this configuration, the NC device 3 operates the air cylinder 23j1 in the same manner as in the above described paragraphs (2) and (3), and advances and retracts the aperture 713 into and from the luminous flux Ls1. The NC device 3 stops the output of the laser beam Ls during the operation of the air cylinder 23j1.

The aperture 713 is inserted to cover the luminous flux Ls1, so that a range for use in machining can be narrowed down in a range of the luminous flux Ls1. That is, the aperture 713 shapes a contour of the luminous flux Ls1 in accordance with a shape of the aperture.

The optical element to be held by the third lens mount 23j is not limited to the aperture 713, and the lens mount can be used freely for any optical element that changes the luminous flux Ls1.

In the selector driving member 23B, a fourth lens mount that moves in a moving direction of the lens mount 23j may be further disposed at a position facing the lens mount 23j.

The lens mounts 23c, 23f and 23j have a tip end portion with a shape that is not limited to a circular-arc shape, and may have cut portions 23c1, 23f1 and 23j3, respectively, each of which is cut as a geometrical circle chord portion as shown in FIG. 8 and FIG. 9.

When the lens mounts 23c, 23f and 23j have the cut portions 23c1, 23f1, and 23j3, a retracted position of each lens mount can be close to the optical axis CL1 of the laser beam Ls. Therefore, the selector driving members 23, 23A and 23B can be reduced in size. That is, the laser machining head 2 can be compact.

Figure 10:
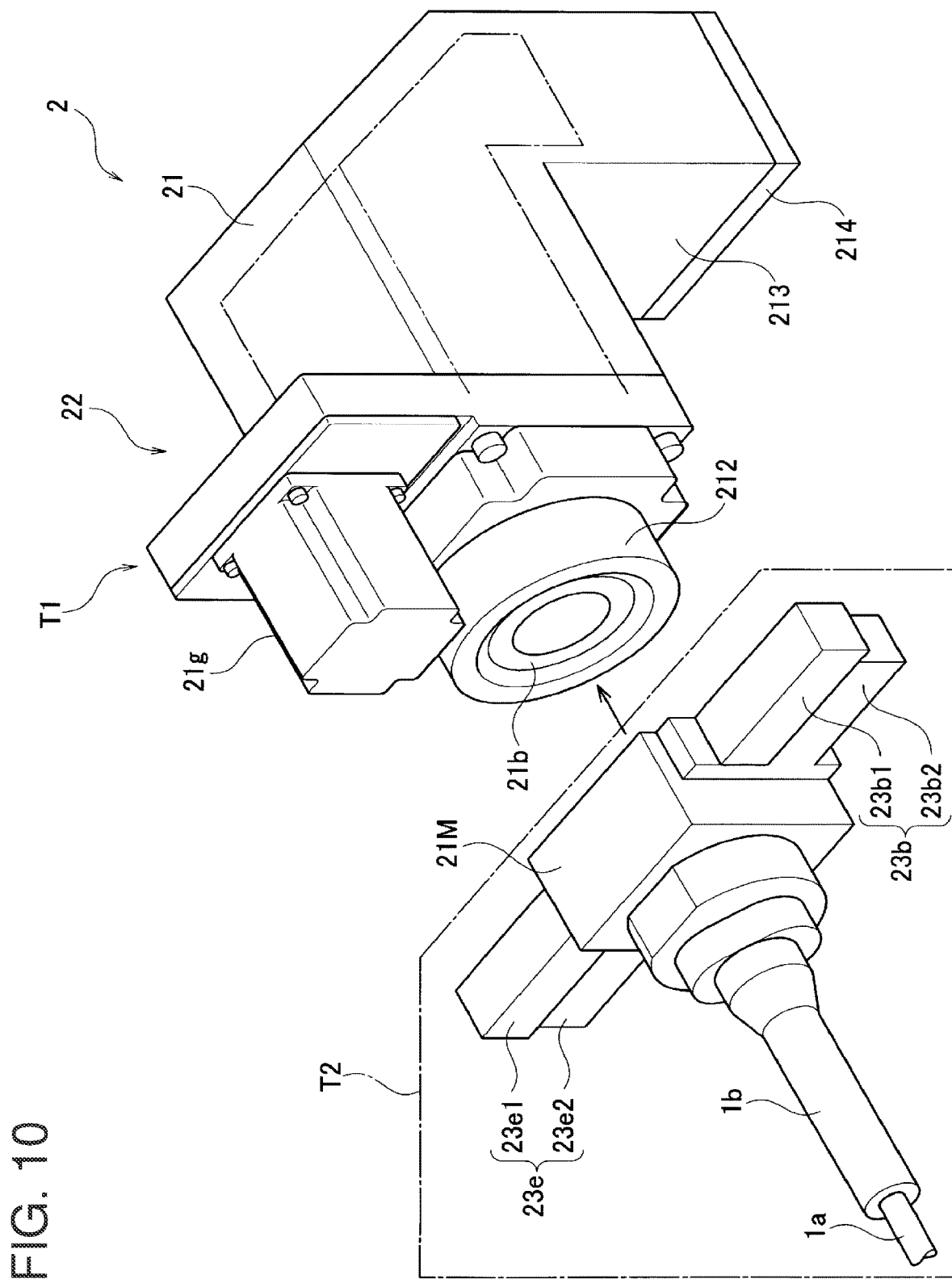
FIG. 10 is a perspective view for explaining a configuration where the laser machining head 2 is divided into a base unit T1 and a selector unit T2.

As shown in FIG. 10, in the laser machining head 2, a plurality of units may be coupled.

Examples of the plurality of units include a base unit T1 of a part on a downstream side including the collimate lens holder 21*b*, and a selector unit T2 of a part including the selector driving member 23 on an upstream side of the collimate lens holder 21*b*.

A plurality of types of selector units T2 may be prepared. Examples of the types include three types including the selector driving members 23, 23A and 23B mounted thereon, respectively.

Consequently, for the laser machining head 2, the base unit T1 can be mounted in common, and the selector units T2 having different specifications can be freely selected and mounted, so that cost reduction due to general use of the base unit T1 can be expected.

Also, when the user introduces the laser machining apparatus 51, the selector unit T2 having an optimum specification for content of machining to be performed by the user can be selected and introduced. Therefore, introduction of a unit having an excessive function for the user can be avoided, and introduction cost can be suppressed.

The laser machining head 2 may include a selector optical axis direction moving member 60 that can move one of the mounted selector driving members 23, 23A, and 23B in the direction of the optical axis CL1.

FIG. 11 is a longitudinal sectional view showing an example where the selector unit T2 of the laser machining head 2 includes the selector optical axis direction moving member 60 that moves the lens mounts 23*c* and 23*f* of the selector driving member 23 in a direction parallel to the optical axis CL1. Also, FIG. 12 is a view seen from an arrow Y2 in FIG. 11.

The selector optical axis direction moving member 60 does not have to entirely move one of the selector driving members 23, 23A, and 23B, and may be at least a unit that moves at least one of the lens mounts 23*c* and 23*f* in the direction parallel to the optical axis CL1.

As shown in FIG. 11 and FIG. 12, the selector unit T2 includes a selector housing 21M corresponding to the upstream housing 211 in the housing 21.

The selector housing 21M includes an adapter 21M*a* holding the coupler 1*b*.

The selector housing 21M includes openings 63 and 64 corresponding to the openings 21*j* and 21*k*. Each of the openings 63 and 64 is formed as a long hole being long in the direction of the optical axis CL1, and the lens mounts 23*c* and 23*f* can pass through the openings in the radial direction, respectively.

The axicon lens 711 is attached to the lens mount 23*c*, and the facet lens 712 is attached to the lens mount 23*f*.

The cylinder rods 23*g*1 and 23*h*1 supporting the lens mounts 23*c* and 23*f* are alternately moved close toward the optical axis CL1 by the operations of the air cylinders 23*b* and 23*e*.

The air cylinders 23*b* and 23*e* are fixed to sliders 67 and 68, respectively, and the sliders 67 and 68 are supported movably in the direction of the optical axis CL1 (a direction of an arrow DRa in FIG. 12) by guides 65 and 66 arranged to extend in the direction of the optical axis CL1.

On the other hand, the selector housing 21M includes selector bases 21M*b* and 21M*c* projecting outward in the radial direction at positions corresponding to the openings 63 and 64.

A linear actuator 61 and the slider 67 are attached to the selector base 21M*b*. A linear actuator 62 and the slider 68 are attached to the selector base 21M*c*.

The sliders 67 and 68 are screwed with rotary drive shafts 61*a* and 62*a* extending in the direction of the optical axis CL1 in the linear actuators 61 and 62.

Consequently, when the linear actuators 61 and 62 operate, the sliders 67 and 68 smoothly move in the direction parallel to the optical axis CL1. That is, the optical element 71 that advances into the luminous flux Ls1 of the laser beams Ls can be moved in the direction parallel to the optical axis CL1.

Specifically, the lens mounts 23*c* and 23*f* independently move between a position A as shown with a solid line and a position B close to the aperture 21*a* as shown with a two-dot chain line. The lens mounts 23*c* and 23*f* can be positioned at an arbitrary position between the position A and the position B.

FIG. 12 shows, with a solid line, a state where the axicon lens 711 advances into the luminous flux Ls1 at the position A.

FIG. 13 is a block diagram showing a configuration of a laser machining apparatus 511 including the selector optical axis direction moving member 60. In the laser machining apparatus 511, operations of the linear actuators 61 and 62 are controlled by the NC device 3.

In response to the operations of the linear actuators 61 and 62, positions of the sliders 67 and 68 corresponding to positions of the axicon lens 711 and the facet lens 712 in the direction of the optical axis CL1 are measured by an unshown encoder and fed back as positional information to the NC device 3.

The flat type of beam profile to be obtained can be finely adjusted by moving the facet lens 712 in the direction of the optical axis CL1.

Figure 14A:
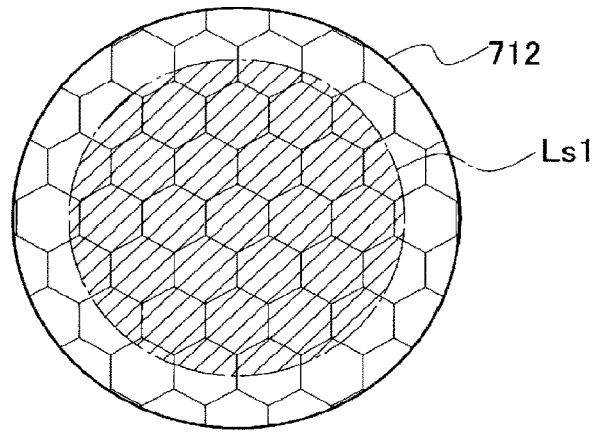
FIG. 14A is a schematic view showing a luminous flux Ls1 passing through a facet lens 711 when the facet lens 711 is at a position A.

FIG. 14A schematically shows the luminous flux Ls1 of the laser beams Ls passing through the facet lens 712, when the facet lens 712 is at the position A.

Figure 14B:
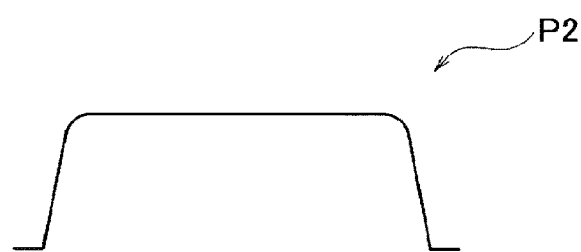
FIG. 14B shows a beam profile obtainable when the facet lens 711 is at the position A.

FIG. 14B shows a beam profile of the luminous flux Ls1 when the facet lens 712 is at the position A. The described flat type P2 of beam profile can be obtained.

Figure 15A:
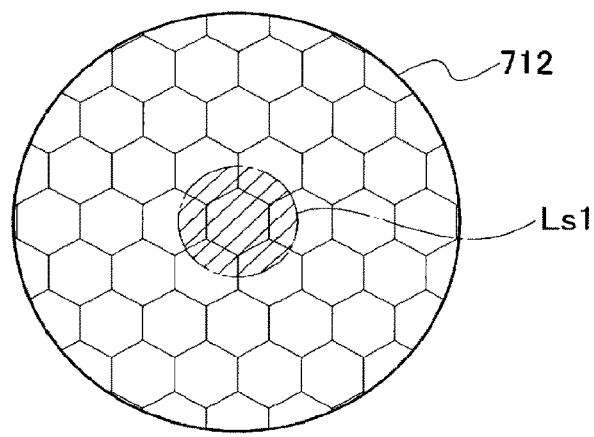
FIG. 15A is a schematic view showing the luminous flux Ls1 passing through the facet lens 711 when the facet lens 711 is at a position B.

FIG. 15A schematically shows the luminous flux Ls1 of the laser beams Ls passing through the facet lens 712, when the facet lens 712 is at the position B.

Figure 15B:
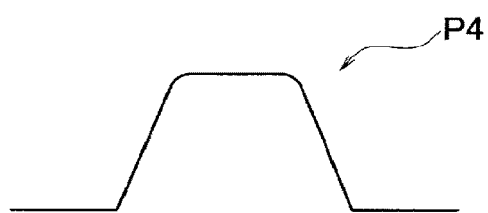
FIG. 15B shows a beam profile obtainable when the facet lens 711 is at the position B.

FIG. 15B shows a beam profile of the luminous flux Ls1 when the facet lens 712 is at the position B. An intermediate type P4 of beam profile can be obtained in which a high intensity part in the gaussian type is flattened.

When the facet lens 712 is moved between the position A and the position B, the beam profile to be obtained is obtained in an intermediate shape corresponding to an arbitrary position between the flat type P2 shown in FIG. 14B and the intermediate type P4 shown in FIG. 15B.

Thus, the laser machining apparatus 511 including the selector optical axis direction moving member 60 can easily set the beam profile more highly optimized on machining conditions.

The disclosure of the present application is associated with the subject matter described in Japanese Patent Application No. 2019-009101 filed on Jan. 23, 2019, and entire content of the disclosure is incorporated herein by reference.

The invention claimed is:

1. A laser machining apparatus comprising:
a laser oscillator configured to output a laser beam;
a laser machining head including a housing;
wherein the housing comprises an upstream housing, an aperture, a collimate lens into which the laser beam output from the laser oscillator enters, a bend mirror, and a focusing lens into which the laser beam enters and is configured to focus the laser beam,
wherein the aperture, the collimate lens, the bend mirror and the focusing lens are arranged in this order from the upstream housing, a first optical element and a second optical element configured to change a beam profile of a luminous flux of laser beams output from the laser oscillator and supplied into the housing to a first beam profile and a second beam profile, respectively;

a selector mechanism provided in the housing and being disposed between the aperture and the collimate lens, and including a first mode switch unit and a second mode switch unit arranged at a same position in a direction of an optical axis of the laser beam and opposite positions in a radial direction across the optical axis, the first mode switch unit being configured to move the first optical element between first advanced position where the first optical element is advanced into the luminous flux and a first retracted position where the first optical element is retracted from the luminous flux in a radial direction of the optical axis, the second mode switch unit being configured to move the second optical element between a second advanced position where the second optical element is advanced into the luminous flux and a second retracted position where the second optical element is retracted from the luminous flux toward an opposite side in the radial direction across the optical axis from the first retracted position; and a NC device configured to operate the first mode switch unit and the second mode switch unit to maintain the first optical element and the second optical element at the first retracted position and the second retracted position, respectively, to maintain the first optical element at the first advanced position and the second optical element at the second retracted position, and to maintain the first optical element at the first retracted position and the second optical element at the second advanced position, the NC device being configured to stop the output of the laser beam when the first optical element and the second optical element move between the advanced position and the retracted positions.

2. The laser machining apparatus according to claim 1, wherein the laser beam is supplied from the laser oscillator to the housing through a fiber cable and a coupler, the laser machining head comprises a base unit not including the coupler and the selector mechanism, and a selector unit including the coupler and the selector mechanism, and the selector unit is detachably attached to the base unit.

3. The laser machining apparatus according to claim 1, wherein the first optical element is an axicon lens, and the second optical element is a facet lens.

4. The laser machining apparatus according to any one of claim 1, further comprising a selector optical axis direction moving mechanism configured to move at least one of the first optical element and the second optical element in a direction parallel to an optical axis of the luminous flux.

5. The laser machining apparatus according to claim 1, wherein the collimate is held by a cylindrical collimate lens holder being configured to be movable in a direction of the optical axis of the laser beam in the housing.

* * * * *